United States Patent [19]

Bernsen et al.

[11] Patent Number: 5,319,723
[45] Date of Patent: * Jun. 7, 1994

[54] METHOD OF PROCESSING PATTERN DATA ON THE BASIS OF RANKED AMPLITUDE VALUES, AND APPARATUS FOR PERFORMING THE METHOD

[75] Inventors: Johannes A. C. Bernsen; Geert Nijholt; Eric H. J. Persoon, all of Eindhoven, Netherlands

[73] Assignee: U. S. Philips Corporation, New York, N.Y.

[ * ] Notice: The portion of the term of this patent subsequent to Oct. 1, 2008 has been disclaimed.

[21] Appl. No.: 713,935

[22] Filed: Jun. 12, 1991

Related U.S. Application Data

[63] Continuation-in-part of Ser. No. 390,327, Aug. 7, 1989, Pat. No. 5,054,095.

[30] Foreign Application Priority Data

Jun. 29, 1990 [EP] European Pat. Off. ........ 90201732.6

[51] Int. Cl.⁵ .......................... G06K 9/64; G06K 9/62; G06K 9/20
[52] U.S. Cl. ........................................ 382/48; 382/30; 382/31; 382/41; 382/33
[58] Field of Search .................. 382/30, 31, 41, 48, 382/52, 33; 358/447, 448, 450, 452; H04N 1/40; G06K 9/62, 9/20, 9/64, 9/68, 9/46, 9/76, 9/36, 9/72

[56] References Cited

U.S. PATENT DOCUMENTS

| 4,597,009 | 6/1986 | Ballmer et al. | 382/52 |
| 4,736,439 | 4/1988 | May | 382/52 |
| 4,933,978 | 6/1990 | Perlman et al. | 382/41 |
| 4,949,389 | 1/1990 | Allebach et al. | 382/31 |
| 5,054,095 | 10/1991 | Bernsen et al. | 382/30 |

FOREIGN PATENT DOCUMENTS 0359301 3/1990 European Pat. Off. ...... G06K 9/64

Primary Examiner—Yon J. Couso
Attorney, Agent, or Firm—Michael E. Marion; Richard A. Weiss

[57] ABSTRACT

Method and apparatus for determining the presence of a predetermined pattern in a spatial field. The invention involves selecting a collection of amplitude values on the basis of location within a multivalued-amplitude field and arranging sequences of amplitude values in order of their magnitude. Amplitude values occurring at predetermined ranks are chosen as characteristic quantities representative of the portion of the field under consideration. By inter-relating a plurality of these characteristic quantities, pattern recognition is accomplished. Preferably rank value filters are employed for producing the characteristic quantities.

10 Claims, 3 Drawing Sheets

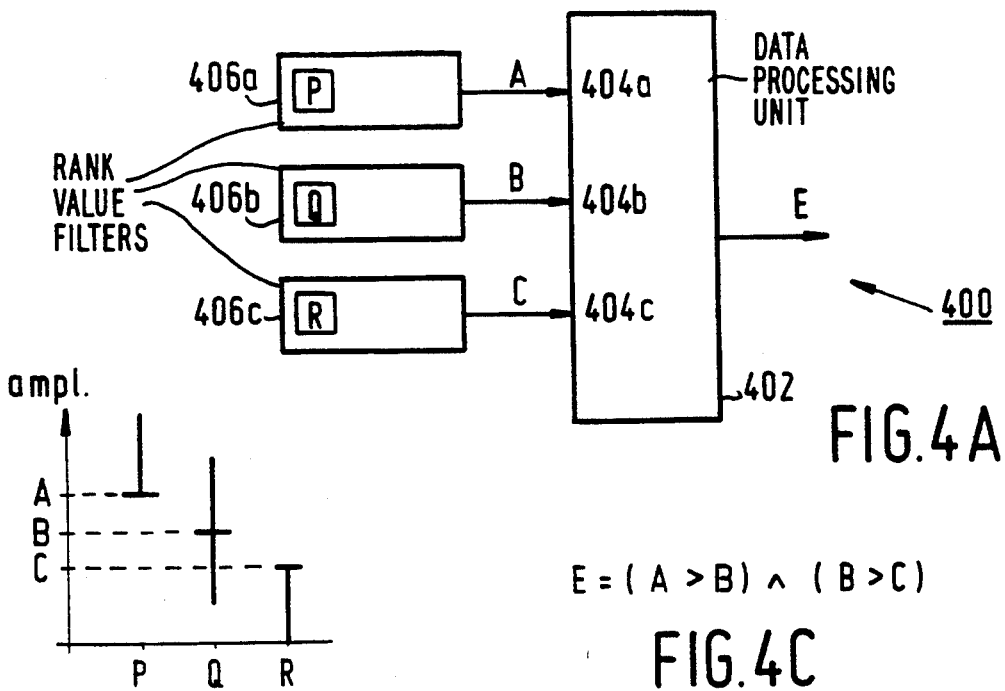
FIG.4A
$E = (A > B) \wedge (B > C)$
FIG.4C
FIG.4B
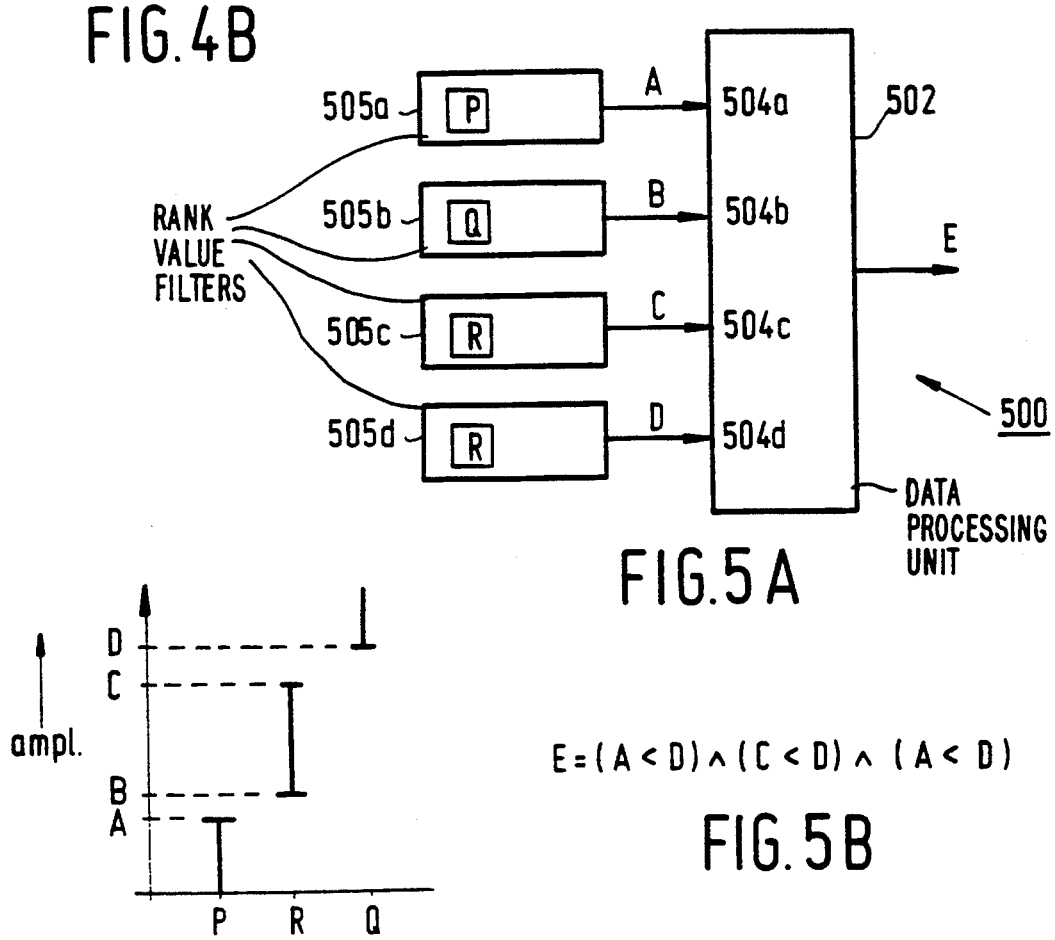
FIG.5A
$E = (A < D) \wedge (C < D) \wedge (A < D)$
FIG.5B
FIG.5C

METHOD OF PROCESSING PATTERN DATA ON THE BASIS OF RANKED AMPLITUDE VALUES, AND APPARATUS FOR PERFORMING THE METHOD

CROSS-REFERENCE TO RELATED APPLICATION

This application is a continuation-in-part of U.S. application Ser. No. 390,327, filed on Aug. 7, 1989, and now issued as U.S. Pat. No. 5,054,095.

BACKGROUND OF THE INVENTION

The invention relates to a method for deciding on the presence of a predetermined pattern at at least one position in a spatial field of data points in which field each data point has a particular amplitude value, the method comprising a comparison between first and second ranked values, the first ranked value having a first predetermined rank in a ranking according to the magnitude of a first collection of amplitude values of data points from a first set of data points at first predetermined locations relative to the position in the spatial field, the second ranked value having a second predetermined rank in a second ranking according to the magnitude of a second collection of amplitude values of data points from a second set of data points at the second predetermined locations relative to the position in the spatial field. The invention also relates to an apparatus for deciding on the presence of a predetermined pattern at at least one position in a spatial field of data points in which field each data point has a particular amplitude value, the apparatus comprising logical decision circuitry for producing a decision from a comparison of amplitude signals at inputs of the circuitry, the amplitude signals being coupled to the circuitry from rank value filters, which filters each have a filter input for receiving a spatial field signal representing the particular values of the data points and producing a ranked amplitude value that occurs at a predetermined rank in a collection of amplitude values of data points from a set of data points at predetermined locations relative to the positin in the spatial field.

A method of this kind is known from European Patent Application No. 89 202 124.7 a foreign counterpart patent to U.S. Pat. No. 5,054,095. The known method detects patterns in which the amplitude values are high in a first set of points and low in a second set of points. For example, in a camera image by way of field of data points, such a pattern would be a certain combination of light areas (the first set) and dark areas (the second set). In the known method, a pattern is said to be detected if all the amplitudes in the first set are above a certain threshold value, and all the amplitudes in the second set are below this threshold. The problem is to decide whether there exists such a threshold. For this purpose, the known method considers the two sets positioned at a predetermined relative position in the field. Subsequently, a lowest boundary value, L, of the range of amplitude values found in the first set is determined, and a highest boundary value, H, is determined for the second set. When L is larger than H, there exists a threshold value as described above, and the pattern is detected.

The known apparatus executing the known method employs a ranked value. A ranked value, R, at a rank n in a collection of mutually different amplitudes, is an amplitude from that collection such that there are exactly (n−1) amplitudes in the collection larger than R. (When the amplitudes are not necessarily mutually different, this definition becomes more complicated: there must be fewer than n amplitudes larger than R in the collection and at least n amplitudes not smaller).

A filter selecting a value at rank 1 produces the highest amplitude value; a filter selecting the amplitude value at rank, N, where N is the number of amplitude values in the collection produces the lowest amplitude value. The reason for using rank filters is that such filters can be effectively implemented in several embodiments even without explicit extraction of the collections of amplitudes. The resulting values are fed into a comparator, in the known apparatus, for forming a detection signal if L exceeds H. Alternatively, the comparator may reserve the detection signal to cases where L exceeds H by more than a predetermined amount.

Although the prior art method and apparatus perform well, they are restricted to pattern detection problems of a substantially binary nature, where there are two sets, one with amplitudes that are high, and one with amplitudes which are low, where the only problem is to decide whether there exists an acceptable threshold. It is therefore an object of the invention to extend the potential of such a method and apparatus, thereby permitting a more differentiated approach to pattern processing.

SUMMARY OF THE INVENTION

A method according to the invention is characterized, in that an outcome of the comparison is verified by at least one further comparison between a further amplitude value from one of the data points, and the first boundary value or an opposite boundary value of the first range. By verifying the comparison with at least one further comparison, an increased number of pattern configurations can be detected in the spatial field. This may involve more complicated relations between the first and second range, or relations between more than two ranges. An example of a more complicated relation is overlap between two ranges, the first with a lower boundary $L_1$ and a higher boundary $H_1$, and the second with boundaries $L_2$ and $H_2$, respectively. Detection of an overlap involves a logical AND between two comparisons: $L_1 < H_2$ and $L_2 < H_1$.

As an example of a relation involving more than two ranges, in a grey level image, an edge may be detected which involves adjacent transitions from a first to a second and from the second to a third amplitude range. Alternatively, various parts of the field, that in the known system were parts of one set, may be taken apart and subjected to different operations, thereby introducing a more refined processing dependence on location. For example, edge detection in a grey level video image may be accomplished by locating three sets: two on either side of the edge and a third between the two. Detection can then be limited to the case where the first set has only higher values than the second, verified if the third set has values intermediate between the first two.

For this purpose, it is necessary that the third range is also spanned by a third collection of data points from the spatial field of data points.

It is not necessary in the method according to the invention that the first, second and third ranges are spanned by all the amplitude values of the data points from the set. In fact, an embodiment is characterized in that each of the respective first, second and third collections of amplitude values comprises the amplitude values of all data points from the respective set of data points, except for a respective first, second and third predetermined number of extreme amplitude values of a more extreme value than all other values. (Where the predetermined number may be zero). By excepting, for example, a few extreme values, the robustness against fluctuations in amplitude value due to noise may be increased. By excepting the lower half of the amplitude values, a range bounded by the median value of the values in the set of data points may be obtained.

An apparatus according to the invention is characterized, in that decision circuitry is arranged for receiving at least three amplitude signals, the decision being produced by a logical combination of at least two comparison results between at least two pairs of input signals. By supplying more than two input signals to the circuitry, each derived as a rank value, which represents the boundary value of a range of amplitude values as discussed above, a verification of a decision obtained from two input signals becomes possible.

For a flexible use of such an apparatus, it is desirable that both the predetermined rank and the predetermined locations are programmable. By programming the rank, the maximum amplitude value (rank 1), or minimum value (rank N, N being the number of points in the set) can be selected. Also, by using less extreme values, say 3 or N−2, the sensitivity to fluctuations in the amplitude values due to noise can be reduced. Other ranks, like N/2, may also be used for discriminations on the basis of the median value of the values from a set of data points.

In some pattern detection problems, a pattern detection is required only at one position. However, in may problems, the pattern detection must be tried at may positions, for example, in the search for a pattern in a video image. In these cases, it is advantageous that an embodiment of the apparatus according to the invention comprises a scanner, for applying the decision method to a series of positions.

BRIEF DESCRIPTION OF THE DRAWINGS

The invention will be explained hereinafter by way of example with reference to the accompanying drawings:

FIGS. 4A-4C show a second exemplary apparatus according to the invention, and FIGS. 5A-5C show a third exemplary apparatus according to the invention.

DETAILED DESCRIPTION OF PREFERRED EMBODIMENTS OF THE INVENTION

Figure 1:
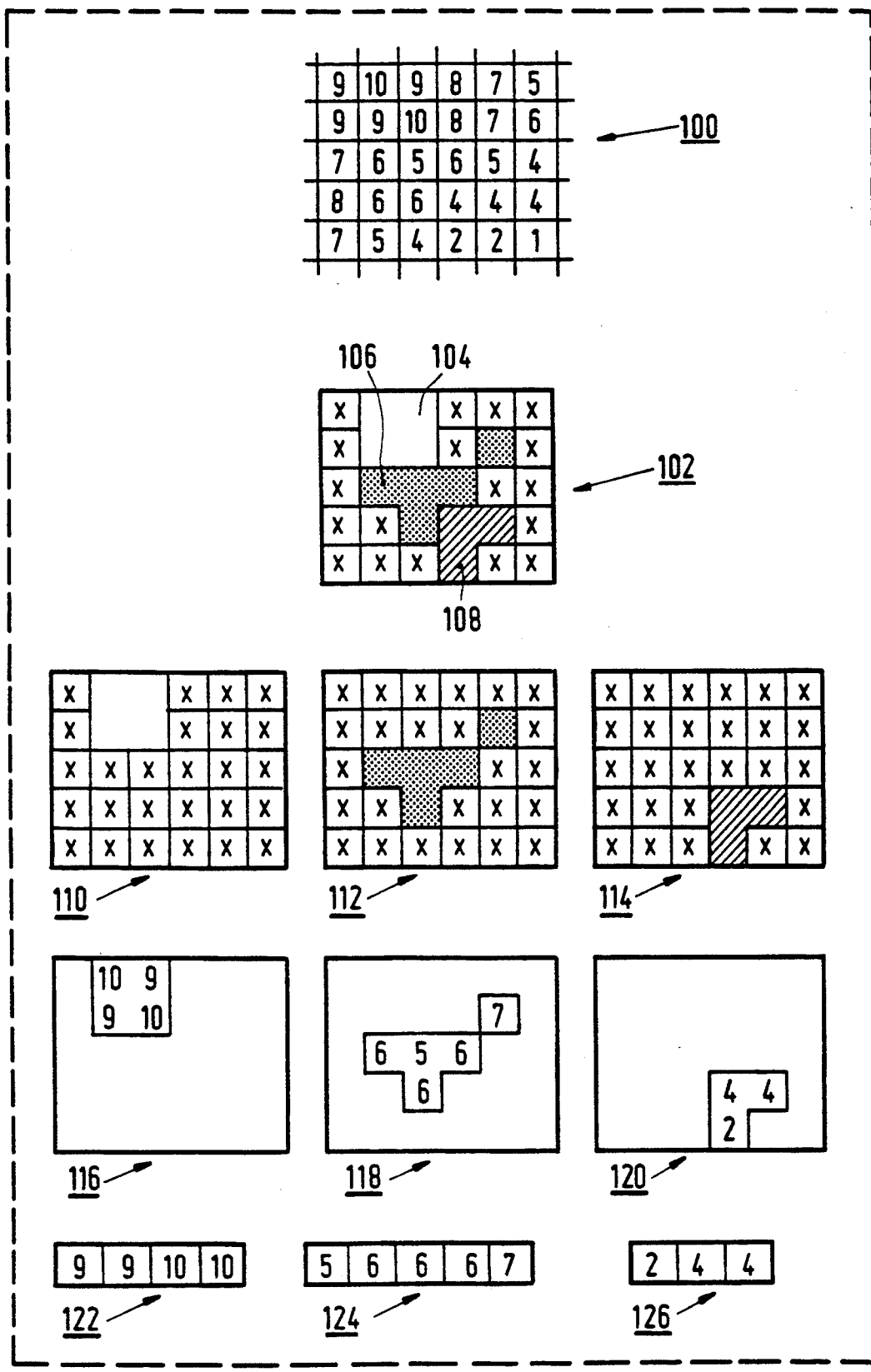
FIG. 1 shows a first example for pattern recognition according to the invention.

In FIG. 1 an example is given of a pattern examination according to the invention. In this example three templates are used, each for evaluating a different portion of the multivalent amplitude field denoted by 100. The number in each mask of field 100 represents the amplitude value associated with that mask.

Within the context of, for example, pattern recognition in video images, these numerals represent the grey values of the pixel. In the case of, for example, remote sensing applications, the numerals represent values of a measured quantity, for example, a temperature or a distance from a reference point, in which case a predetermined coherence is pursued between the measured values and their mutual orientation.

It is to be noted that the use of a method or an apparatus in accordance with the invention is not restricted to the two-dimensional fields like that of the example shown in FIG. 1. The use of a method in accordance with the invention with one-dimensional fields consists, for example, in the search for a predetermined pattern in a (distorted), digital signal. A use of a method in accordance with the invention with three-dimensional fields consists, for example, in the search for a predetermined pattern in a data field obtained by computer tomographic examination of an object. It is also to be noted that the field to be examined, having multi-valent amplitudes, need not be subdivided into (similar) elements as shown by way of example in FIG. 1. A continuous field can also be examined for a given pattern, provided that representative discrete values are assigned to parts of the field considered upon association with the submasks.

The pattern information sought is visualized under reference numeral 102. This particular pattern is divided into a part 104 that indicates the required segment of relatively high amplitude, a part 106 that indicates the required segment of intermediate amplitude, and a part 108 that indicates the required segment of relatively low amplitude. The crosses in pattern 102 denote the irrelevant parts (the don't cares). Three templates 110, 112 and 114 in combination represent the pattern 102, that is template 110 relates to the contribution of part 104, template 112 relates to the contribution of part 106 and template 114 relates to the contribution of part 108.

Associating these templates with field 100 produces the sets of amplitudes 116, 118 and 120, respectively, that reflect the field values in the respective windows of the template. For each set, the detected amplitude values are arranged in an ordered sequence as indicated by 122, 124 and 126 for the respective sets.

For recognition, it is, for instance, required for the amplitude values obtained, that the lower bound of the high amplitude range related to sequence 122 is larger than the upper bound of the intermediate amplitude range related to sequence 124, and that the upper bound of the low amplitude range related to sequence 126 is smaller than the lower bound of the intermediate amplitude range related to sequence 124. In the above example, the match between the templates 110, 112 and 114 and the field occurs, because the respective bounds validate the required conditions. Other criteria may be formulated in order to identify a match. For instance, the relevant differences between the pairs of bounds may be prescribed in order to control the pattern detection in dependence on the presence of more or less pronounced features. The characteristic quantities need not all be equal to a lower or an upper bound. Medium amplitude values may be chosen, for instance, in order to represent in the above example the intermediate amplitude range. Equally, amplitude values occurring at other ranks in the ordered sequences such as 122, 124 and 126 may be chosen as representatives of the characteristic quantities.

Figure 2:
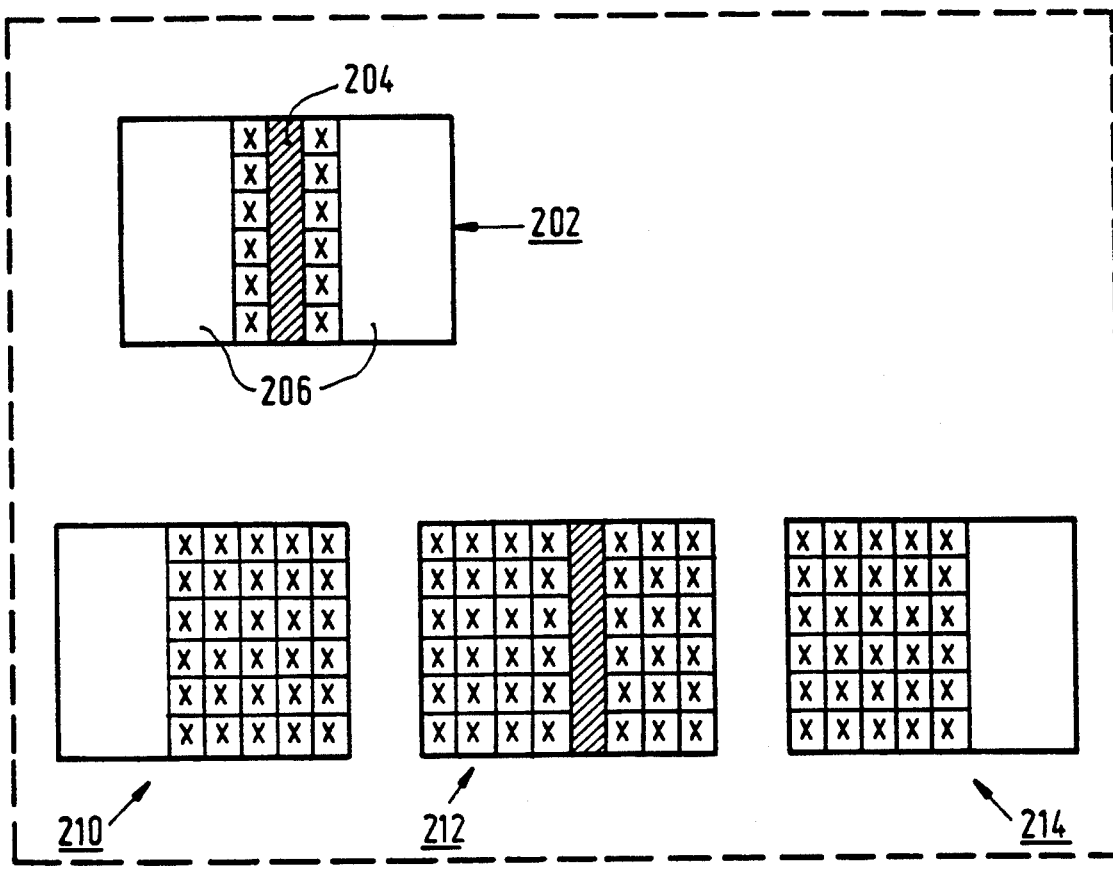
FIG. 2 shows a second example for pattern recognition according to the invention.

In FIG. 2, another example is given of a pattern examination according to the invention. The pattern 202 to be detected relates to a dark line 204 against a bright background 206. Again, the crosses indicate don't cares.

Three templates are used for representing the above structure, a left-hand-side template 210 corresponding with the left background part, the middle template 212, corresponding with the dark line, and the right-hand-side template 214, corresponding with the right background part. By assigning separate templates to the various parts constituting the pattern, a coherent set of amplitudes is generated for each part, thereby enabling each set to be processed in an appropriate manner. For instance, each set may be examined under conditions that are location-dependent. That is, the left-hand-side background may be treated differently from the right-hand-side background. Deviations from the high amplitude background may be accepted for recognition, which deviations may differ mutually for the right-hand side and the left-hand side. For example, upon associating template 210 with the multivalent amplitude field (not shown) recognition for the left-hand-side area may be established despite the fact that the relevant section of the field is polluted with darker spots. That is, the ordering of the amplitude values comprise values that also may occur in the part of the field associated with the relevant part of template 212. In order to take these deviations into account, the rank in the corresponding ordered sequence of the value representative of the characteristic quantity need not be related to the upper or lower bound of the belonging amplitude range. For further explanation reference is made to the above-mentioned prior art.

Figure 3:
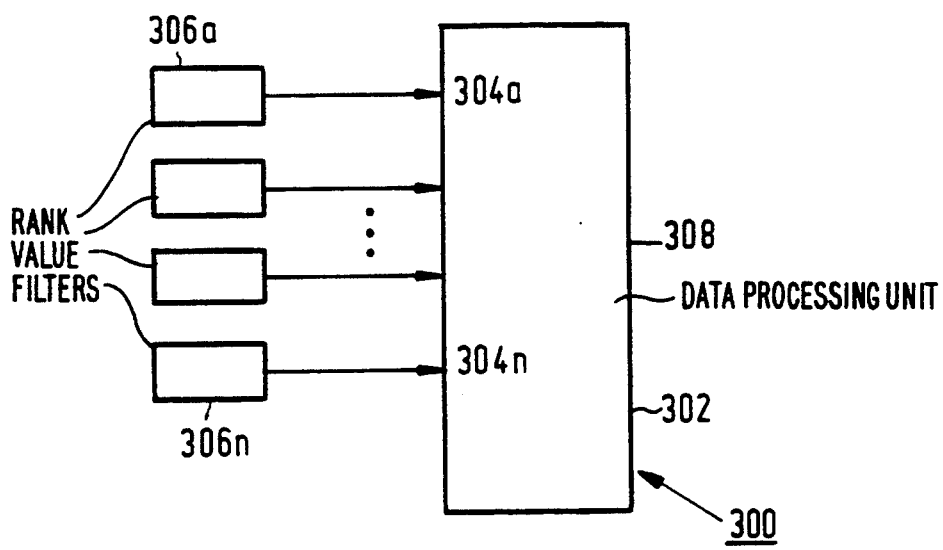
FIG. 3 shows a first exemplary apparatus according to the invention.

FIG. 3 shows an example of an apparatus 300 according to the invention. The apparatus 300 includes a data processing unit 302 and a plurality of inputs 304a... 304n being coupled with a plurality of rank value filters 306a... 306n. The rank value filters 306a... 306n each transmit a characteristic quantity derived from the respective set of ordered amplitudes that represent the field within the window of the associated template (not shown) coupled with a particular rank value filter. Upon reception of the characteristic quantities, each being an amplitude value at a predetermined rank in the respective set of ordered amplitudes, the data processing unit 302 may execute a pairwise comparison, thereby producing logic values indicative of the compare result. These logic values may then be interrelated according to some logic function for producing an output quantity at output 308 indicating the presence or absence of predetermined correlations.

In FIGS. 4A–4C, a second exemplary apparatus 400 according to the invention is shown for visualizing the examination of the interrelationship among the various characteristic quantities. The apparatus 400 includes a data processing unit 402 and inputs 404a, 404b and 404c being coupled to the rank value filters 406a, 406b and 406c, respectively. The part of the field examined by each individual filter is indicated by the letters P, Q and R in the filters 406a, 406b and 406c, respectively. Filter 406a is programmed to produce a quantity A indicative of a minimum amplitude value occurring within the part P of the field examined by this filter. Filter 406b is programmed to produce a quantity B that is indicative of a median amplitude value occurring within the associated part Q of the field. Filter 406c is programmed to produce a quantity C indicative of a maximum amplitude occurring within part R of the field. In case these characteristic quantities validate the logic relationship as shown in FIG. 4B, that is, the maximum value A is larger than the minimum value C while the median value B lies in between (this has also been visualized in FIG. 4C), data processing unit 402 outputs a confirmation output signal E.

In FIGS. 5A–5C, a third exemplary apparatus 500 according to the invention is shown for visualizing the examination of another interrelationship. The apparatus 500 comprises a data processing unit 502 and data inputs 504a, 504b, 504c and 504d coupled with rank value filters 505a, 505b, 505c and 505d respectively. The respective parts of the field are named P, Q and R and are examined by the respective rank filters. Filter 505a is programmed to examine part P for producing a quantity A indicative of the maximum amplitude value occurring within this part. Filter 505b is programmed to examine part Q in order to produce a characteristic quantity B indicative of the minimum amplitude value occurring in part Q. Filters 505c and 505d both examine a part R of the field, filter 505c producing a quantity C indicative of a maximum value with part R and filter 505d producing a quantity D indicative of a minimum value within part R. In case minimum D is larger than maximum A, while C and B lie in between, data processing unit 502 outputs a confirmative output signal E according to the relation of FIG. 5B. In addition, the interrelationship has been visualized in FIG. 5C.

We claim:

1. A method of determining the presence of a predetermined pattern positioned in a spatial field of data points, wherein each data point has a particular amplitude value and wherein a first group of particular amplitude values for a first set of data points at first locations relative to the position of the predetermined pattern in the spatial field are ranked according to their respective amplitude values, and a second group of particular amplitude values for a second set of data points at second locations relative to the position of the predetermined pattern in the spatial field are ranked according to their respective amplitudes values, the method comprising the steps of:
  a) making a first comparison between a first ranked value from said first group of particular amplitude values and a second ranked value from said second group of particular amplitude values; and
  b) making a second comparison between a selected particular amplitude value of one of said data points and a third ranked value from said first group of particular amplitude values;
  wherein said second comparison verifies the results of said first comparison.

2. The method of claim 1, wherein a third group of particular amplitude values for a third set of data points at third locations relative to the position of the predetermined pattern in the spatial field are ranked according to their respective magnitudes, and wherein said selected particular amplitude value is a fourth ranked value from said third group of particular amplitude values.

3. An apparatus for determining the presence of a predetermined pattern positioned in a spatial field of data points, each data point having a particular amplitude value, the apparatus comprising:
  a) a plurality of rank value filters each having an input for receiving a respective group of particular amplitude values for a set of data points at locations relative to the position of the predetermined pattern in the spatial field, wherein each respective rank value filter ranks its respective group of particular amplitude values according to their respective amplitude values to produce a respective amplitude signal representing a ranked amplitude value having a predetermined rank within its respective group; and b) decision means coupled to said rank value filters for receiving and making comparisons between at least two pairs of said amplitude signals, and for producing a decision as to whether the predetermined pattern has been detected by performing a logical combination of the results of at least two of said comparisons.

4. The apparatus according to claim 3, in which at least one predetermined rank is programmable.

5. The apparatus according to claim 3, in which the locations are programmable.

6. The apparatus according to claim 3, in which the logical combination in said decision means is programmable.

7. The apparatus according to claim 4, in which the locations are programmable.

8. The apparatus according to claim 4, in which the logical combination in said decision means is programmable.

9. The apparatus according to claim 5, in which the logical combination in said decision means is programmable.

10. The apparatus according to claim 7, in which the logical combination in said decision means is programmable.

* * * * *